May 4, 1926.

P. O. DIEDERICHS

MIXING MACHINE

Filed Jan. 5, 1925

1,583,129

Inventor:
Paul O. Diederichs.
By Fiske, Towl, Claff & Soans
Attys

Patented May 4, 1926.

1,583,129

UNITED STATES PATENT OFFICE.

PAUL O. DIEDERICHS, OF CHICAGO, ILLINOIS, ASSIGNOR TO AMERICAN OVEN & MACHINE COMPANY, OF CHICAGO, ILLINOIS, A CORPORATION OF ILLINOIS.

MIXING MACHINE.

Application filed January 5, 1925. Serial No. 483.

*To all whom it may concern:*

Be it known that I, PAUL O. DIEDERICHS, a citizen of the United States, and a resident of Chicago, in the county of Cook and State of Illinois, have invented certain new and useful Improvements in Mixing Machines, of which I declare the following to be a full, clear, and exact description, reference being had to the accompanying drawing, forming a part of this specification.

The present invention is particularly applicable to that class of machines for mixing and kneading dough in which the mixing chamber is provided with a stationary cover, beneath which such chamber is revolved or tilted to discharge its contents, and permit the chamber to be cleaned. The invention consists in the novel construction of cover herein described, illustrated in the accompanying drawing, and particularly pointed out in the claims at the end of the specification.

Figure 1:
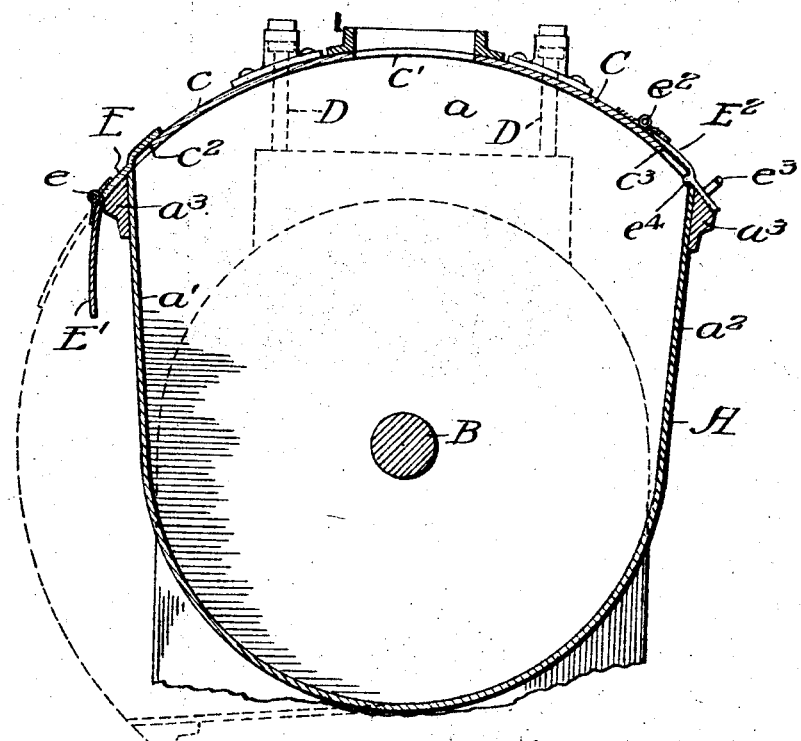
Fig. 1 is a view in central vertical section, through a dough mixing machine embodying my invention.

In a mixing machine of the character to which my invention applies, the mixing chamber is provided with one or more beater arms, adapted to revolve within the chamber. In practice, it is found, as for example in the mixing of dough, that when the ingredients of the batch are placed within the mixing chamber, and the beater arms are revolved, liquid will be thrown against the underside of the cover; and this liquid will flow down the underside of the cover and more or less of it is apt to leak through the joint between the cover and the front and rear walls of the mixing chamber. The primary object of my invention is to prevent such leakage and insure that any liquid thrown against the underside of the cover shall drip back into the body of the mixing chamber.

Referring to the accompanying drawing A designates the mixing chamber, which is of a type commonly used in dough mixing machines. This mixing chamber A, is mounted to revolve about a central shaft B, or trunnions, and the upper edges of the end walls $a$ of the mixing chamber are curved upon an arc concentric with the shaft or axis B, so as to enable the chamber A to be tilted from the position shown in full lines to the position shown by dotted lines in Fig. 1 of the drawing. The front and rear walls $a'$ and $a^2$ of the mixing chamber are shown as reinforced by bars $a^3$ as is usual with dough mixing chambers of this character.

Above the mixing chamber A is mounted the cover C that is curved to conform to the curvature of the end walls $a$ of the mixing chamber. This cover C is stationarily supported relative to the mixing chamber A, in any of the well known ways. As shown, the cover C is connected at its ends to the inwardly turned portions of the bars or brackets D, the lower ends of which are carried by suitable pedestals D'.

Figure 2:
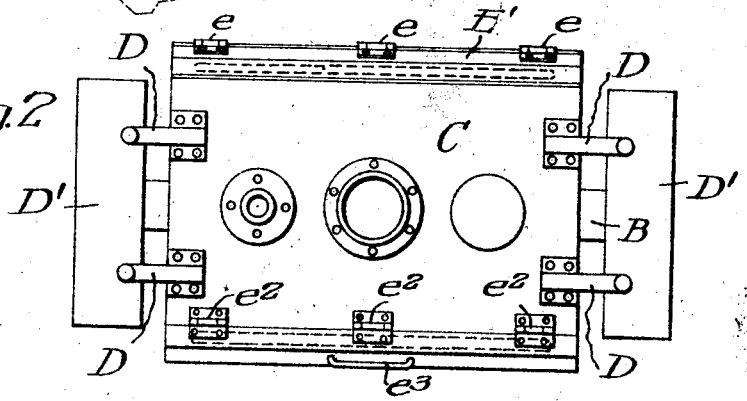
Fig. 2 is a plan view, upon a reduced scale, of the cover and means for supporting the same.

In the form of the invention illustrated in Figs. 1 and 2 of the drawings, the cover C is formed of a main sheet metal plate $c$, having the usual central opening $c'$ therein, through which the flour to be mixed will be delivered to the mixing chamber. To the front edge of the plate $c$ of the cover is secured, as by welding or riveting, a supplemental plate E, the inner portion of this plate E being slightly offset to enable it to overlap the front edge of the plate $c$. By this arrangement the front edge of the plate $c$ constitutes a drip shoulder $c^2$, that is within the line of the front wall $a'$ of the mixing chamber, and from this drip shoulder liquid thrown on the under side of the cover will drip back into the mixing chamber. As shown, the supplemental plate E has hinged thereto as at $e$ the usual sheet metal flap or plate E'.

To the rear edge of the cover C is connected a supplemental plate $E^2$ and preferably this plate is united by hinges $e^2$ to the plate C, so as to enable the supplemental plate $E^2$ to be lifted, as by its handle $e^3$ in order to permit certain ingredients, such as additional yeast, water or other material, to be placed in the mixing chamber. Inasmuch as the supplemental plate $E^2$ extends over the rear edge portion of the cover C, the rear edge of the cover C forms a drip shoulder $c^3$ extending longitudinally from end to end of the cover, and from this shoulder $c^3$ liquid thrown upon the under side of the cover will drip down into the mixing chamber. Preferably, the rear drip shoulder $c^3$ of the cover C is arranged at a greater distance from the rear wall $a^2$ of the mixing chamber than the distance between the front shoulder $c^2$ and the front wall $a'$ of the mixing chamber, the purpose of this construction being to afford ample space when the supplemental plate $E^2$ is lifted to permit materials to be placed in the mixing chamber.

In dough mixing machines of the character to which my invention relates, the greatest danger of leakage is above the rear wall $a^2$ of the mixing chamber, as the revoluble beater arms tend to throw the liquid against the rear part of the cover. I therefore prefer to provide the supplemental plate $E^2$ adjacent the top of the rear wall $a^2$ of the mixing chamber with a depending rib or baffle $e^4$ that will come in close proximity to the top edge of the rear wall $a^2$ of the mixing chamber when the latter is in position for use, this rib or wall $e^4$ extending between the end walls of the mixing chamber. Inasmuch as this rib or baffle $e^4$, as shown in Fig. 1, depends below the top edge of the wall $a^2$, the bottom portion of this rib or baffle $e^4$ is preferably rounded or inclined, so that as the mixing chamber is tilted forward to discharge its contents, the top edge of the back wall $a^2$ will contact with the inclined or rounded surface of the rib or baffle $e^4$ and will slightly lift the hinged supplemental plate $E^2$.

From the foregoing description it will be seen that when the mixing chamber is in position for use, as illustrated in full lines in Fig. 1 of the drawing, the cover C serves to tightly close the mixing chamber and the drip shoulders $c^2$ and $c^3$ at the front and rear of the cover and the rib or baffle $e^4$ (if the latter be used) insure that any liquid thrown against the under side of the cover shall drip back into the mixing chamber and not pass over the front and rear walls thereof. Inasmuch as the under side of the curved cover C which overlaps the curved under walls of the mixing chamber has no obstructions, it will be seen that the mixing chamber can be readily turned to discharge its contents from the position shown by full lines in Fig. 1 to the position shown by dotted lines in such figure of the drawing; and when the rib or baffle, serving as a drip shoulder, is employed on the hinged supplemental plate $E^2$, this will not interfere with the tilting movement of the mixing chamber.

Figure 3:
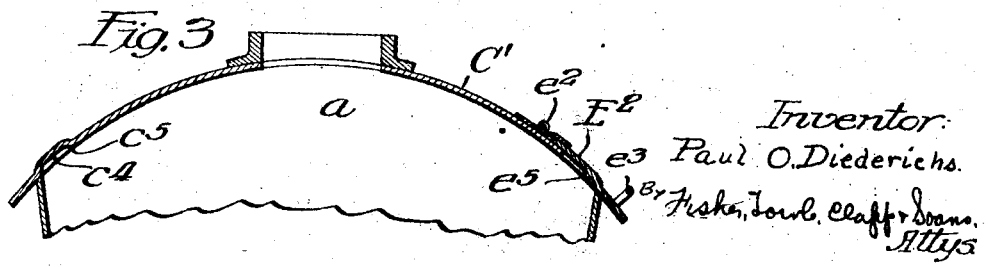
Fig. 3 is a view in central vertical section through the top of the mixing chamber, and through a cover embodying a modified form of my invention.

In the modified form of the invention illustrated in Fig. 3 of the drawing, the cover C' is shown as having its front portion made from a single metal plate near the front edge of which is formed a channel $c^4$ that extends lengthwise of the cover from approximately end to end thereof. The channel $c^4$ thus formed by "bumping" out or offsetting a portion of the cover C' adjacent its front edge, affords a drip shoulder $c^5$ that extends from end to end of the mixing chamber and insures that liquid thrown against the under side of the cover shall drip back into the mixing chamber. In the form of the invention illustrated in Fig. 3, the supplemental plate $E^2$ is similar in construction to the supplemental plate $E^2$ hereinbefore described and in like manner is offset to overlap the rear edge portion of the cover C' and is hinged as at $e^2$ adjacent the rear edge portion of the cover. In this form of the invention, however, the under side of the supplemental plate $E^2$ is shown as provided with a rib or baffle $e^5$ that will extend from approximately end to end of the supplemental plate $E^2$ and will afford a supplemental drip shoulder to enable any liquid thrown against the supplemental plate $E^2$ to drip back into the mixing chamber. This rib or baffle $e^5$ is shown in Fig. 3 as not depending below the curved upper edges and the end walls $a$ of the mixing chamber. Preferably, the channel $c^4$ will terminate at a slight distance away from the ends of the cover so that the danger of any material escaping from the ends of the channel will be avoided. It will be understood, however, that inasmuch as the cover is formed of comparatively thin sheet metal, the channel $c^4$ might extend from end to end of the cover; so, also, it will be understood that the extreme ends of the supplemental plates E and $E^2$ may be pressed down or shaped to fit upon the curved upper edges of the end walls of the mixing chamber to prevent any escape of material at such points.

It will be understood that the details of construction above set out may be varied without departing from the spirit of the invention and that features of the invention may be employed without its adoption as an entirety.

Having thus described my invention, what I claim as new and desire to secure by Letters Patent is:

1. A mixing machine comprising a mixing chamber having end walls with curved upper edges, and a curved cover the under surface of which is provided with a drip shoulder extending lengthwise thereof adjacent its edge and over said chamber.

2. A mixing machine comprising a mixing chamber having end walls with curved upper edges, and a curved cover the under surface of which is provided with a drip shoulder extending lengthwise thereof adjacent its front edge and with a similar drip shoulder extending lengthwise of said cover adjacent its rear edge and over said chamber.

3. A mixing machine comprising a mixing chamber pivoted to tilt about its axis and having its end walls curved upon an arc substantially concentric with said axis and a fixed cover the under surface whereof is curved to correspond with the curved end walls of said chamber, the under surface of said cover being formed with a drip shoulder adjacent one of its edges and extending lengthwise of the cover.

4. A mixing machine comprising a mixing chamber having end walls with curved upper edges and a curved cover, one edge of said curved cover being provided with a movable supplemental plate extending lengthwise of the cover, said cover having a drip shoulder extending beneath said supplemental plate and lengthwise from end to end thereof.

5. A mixing machine comprising a mixing chamber having end walls with curved upper edges and a curved cover, one edge of said curved cover having hinged thereto a supplemental plate extending lengthwise of the cover, said cover having a drip shoulder extending beneath said supplemental plate and lengthwise from end to end thereof.

6. A mixing machine comprising a mixing chamber, a cover therefor, the rear edge of said cover terminating inside the wall of said mixing chamber and forming a drip shoulder extending from end to end of the cover, and a supplemental plate extending over the edge of said cover and hinged thereto.

7. A mixing machine comprising a mixing chamber having end walls with curved upper edges, and a curved cover adapted to close upon the curved edges of the mixing chamber the end surface of said cover being provided adjacent its edge and above the interior of the mixing chamber with a rib or baffle extending lengthwise thereof.

8. A mixing machine comprising a mixing chamber, a cover therefor, and a supplemental plate extending lengthwise of said cover and hinged thereto, said supplemental plate having upon its under surface a rib or baffle extending lengthwise of said plate and in proximity to the back wall of the mixing chamber.

9. A mixing machine comprising a mixing chamber pivotally mounted to be tiltable about its axis and having its end walls curved upon an arc substantially concentric with said axis, a fixed cover the under surface of which is curved to correspond with the curved end walls of the chamber, a drip shoulder depending from said cover adjacent one of its edges and extending lengthwise of the cover, and a supplemental plate hingedly connected to said cover and having a baffle extending lengthwise thereof in proximity to one wall of the mixing chamber.

PAUL O. DIEDERICHS.